(12) United States Patent
Ishida et al.

(10) Patent No.: US 8,202,597 B2
(45) Date of Patent: Jun. 19, 2012

(54) MULTILAYER OPTICAL RECORDING MEDIUM, METHOD AND APPARATUS FOR MANUFACTURING THE MULTILAYER OPTICAL RECORDING MEDIUM

(75) Inventors: Toshio Ishida, Kanagawa (JP); Katsuhiko Meguro, Kanagawa (JP); Toshiyuki Kitahara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 329 days.

(21) Appl. No.: 12/720,183

(22) Filed: Mar. 9, 2010

(65) Prior Publication Data
US 2010/0233414 A1 Sep. 16, 2010

(30) Foreign Application Priority Data
Mar. 12, 2009 (JP) .................. 2009-059617

(51) Int. Cl.
*B32B 3/02* (2006.01)
(52) U.S. Cl. .................. 428/64.1; 428/64.4; 430/270.11
(58) Field of Classification Search .................. 428/64.1
See application file for complete search history.

(56) References Cited

U.S. PATENT DOCUMENTS
2003/0123149 A1* 7/2003 Xi et al. ........................ 359/497
2005/0142318 A1 6/2005 Nakabayashi et al.

FOREIGN PATENT DOCUMENTS
JP 2005-259192 9/2005
JP 2008-108381 5/2008
* cited by examiner

*Primary Examiner* — Elizabeth Mulvaney
(74) *Attorney, Agent, or Firm* — Young & Thompson

(57) ABSTRACT

A multilayer optical recording medium includes: a substrate; a plurality of optical recording layers provided on the substrate; and a plurality of intermediate layers each provided between adjoining optical recording layers disposed in a thickness direction. In this multilayer optical recording medium, each of the intermediate layers has a birefringence property and a principal axis direction of birefringence of each intermediate layer is oriented at 90 degrees with respect to that of an adjoining intermediate layer.

8 Claims, 10 Drawing Sheets

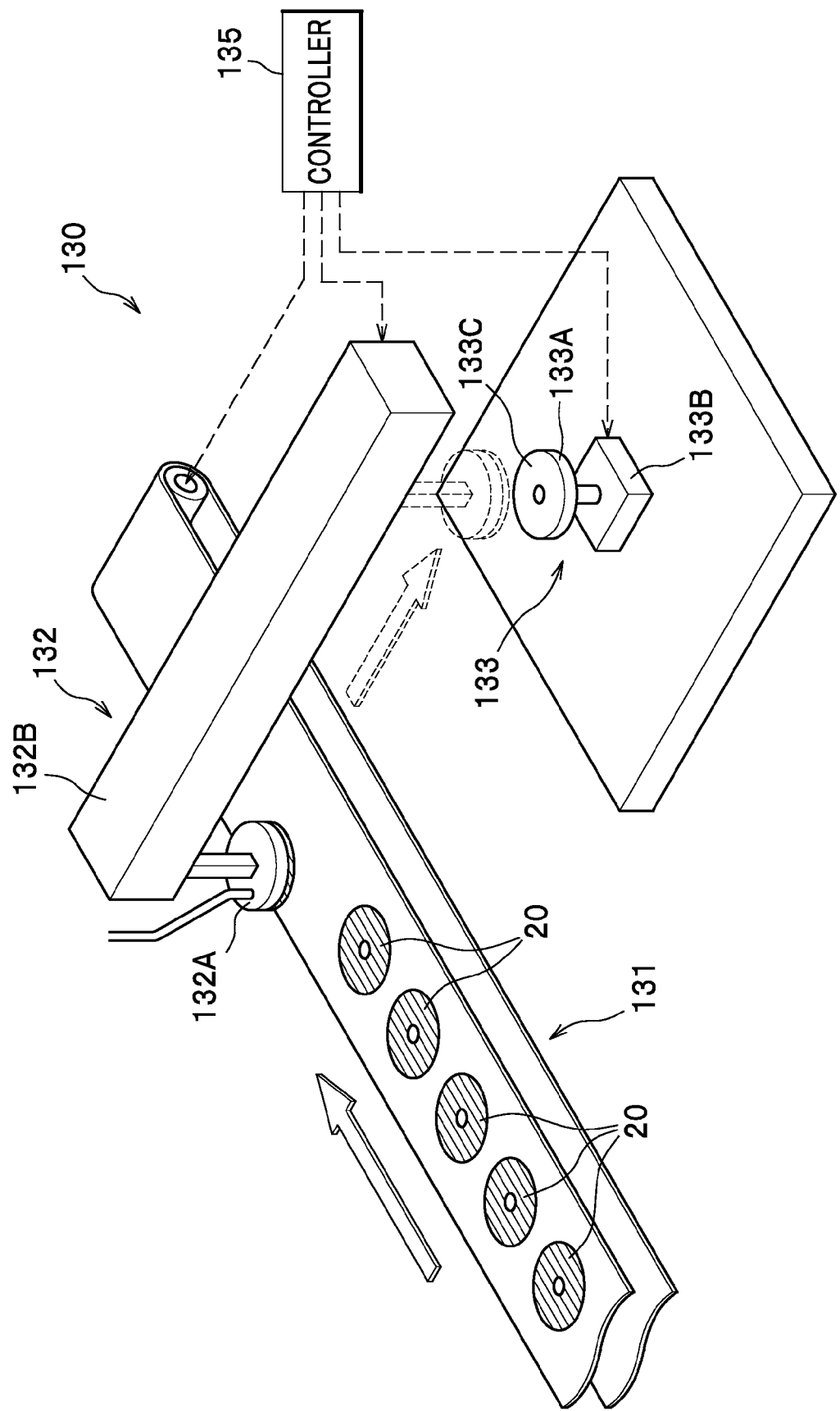

FIG. 9

| SITE NUMBER | MATERIAL | L | W | BIREFRINGENCE AMOUNT [nm] | PRINCIPAL AXIS DIRECTION [degree] |
|---|---|---|---|---|---|
| 1 | PET1 | 0cm | 0cm | 52 | 2 |
| 2 | PET1 | 0cm | 12cm | 34 | 3 |
| 3 | PET1 | 0cm | 24cm | 10 | 5 |
| 4 | PET1 | 100cm | 0cm | 23 | 4 |
| 5 | PET1 | 100cm | 12cm | 3 | 4 |
| 6 | PET1 | 100cm | 24cm | 1 | 7 |
| 7 | PET1 | 110cm | 0cm | 42 | 5 |
| 8 | PET1 | 110cm | 30cm | 38 | 7 |
| 9 | PET1 | 110cm | 60cm | 25 | 8 |
| 10 | PET1 | 110cm | 90cm | 12 | 10 |
| 11 | PET1 | 150cm | 0cm | 37 | 6 |
| 12 | PET1 | 150cm | 30cm | 11 | 8 |
| 13 | PET1 | 150cm | 60cm | 3 | 9 |
| 14 | PET1 | 150cm | 90cm | 2 | 11 |
| 15 | PET1 | 210cm | 0cm | 40 | 9 |
| 16 | PET1 | 210cm | 30cm | 12 | 10 |
| 17 | PET1 | 210cm | 60cm | 8 | 11 |
| 18 | PET1 | 210cm | 90cm | 2 | 12 |
| 19 | PET1 | 250cm | 0cm | 42 | 7 |
| 20 | PET1 | 250cm | 30cm | 38 | 9 |
| 21 | PET1 | 250cm | 60cm | 25 | 10 |
| 22 | PET1 | 250cm | 90cm | 12 | 10 |
| 23 | PET1 | 280cm | 0cm | 40 | 6 |
| 24 | PET1 | 280cm | 30cm | 36 | 8 |
| 25 | PET1 | 250cm | 60cm | 28 | 8 |
| 26 | PET1 | 250cm | 90cm | 15 | 9 |
| 27 | PET1 | 40cm | 90cm | 51 | 7 |
| 28 | PET1 | 40cm | 0cm | 49 | 3 |
| 29 | PET1 | 40cm | 12cm | 42 | 3 |
| 30 | PET1 | 40cm | 24cm | 29 | 5 |
| 31 | PET1 | 70cm | 0cm | 47 | 4 |
| 32 | PET1 | 70cm | 12cm | 40 | 4 |
| 33 | PET1 | 70cm | 24cm | 27 | 7 |
| 34 | PET2 | 0cm | 0cm | 50 | 15 |
| 35 | PET2 | 0cm | 12cm | 45 | 10 |
| 36 | PET2 | 0cm | 24cm | 30 | 4 |
| 37 | PET2 | 13cm | 0cm | 45 | 14 |
| 38 | PET2 | 13cm | 12cm | 40 | 9 |
| 39 | PET2 | 13cm | 24cm | 20 | 3 |
| 40 | PP | 0cm | 0cm | 22 | 7 |
| 41 | PP | 0cm | 12cm | 2 | 3 |
| 42 | PP | 0cm | 24cm | 15 | 4 |
| 43 | PP | 13cm | 0cm | 10 | 6 |
| 44 | PP | 13cm | 12cm | 0 | 1 |
| 45 | PP | 13cm | 24cm | 22 | 5 |

FIG. 10

| | SITE NUMBER OF BASE FILM USED FOR LAMINATION | ROTATIONAL DIRECTION /ANGLE | BIREFRINGENCE AMOUNT [nm] |
|---|---|---|---|
| EXAMPLE 1 | 1/4/2/5/3/6 | REVERSE DIRECTION/90° | 23 |
| EXAMPLE 2 | 7/11/8/12/9/13/10/14/15/19/16/20/17/21/18/22/23/25/24/26 | FORWARD DIRECTION/90° | 35 |
| COMPARATIVE EXAMPLE 1 | 27 | 0 | 51 |
| COMPARATIVE EXAMPLE 2 | 28/31/29/32/30/33 | 0 | 231 |
| EXAMPLE 3 | 34/37/35/38/36/39 | FORWARD DIRECTION/90° | 10 |
| EXAMPLE 4 | 40/43/41/44/43/45 | FORWARD DIRECTION/90° | 18 |

# MULTILAYER OPTICAL RECORDING MEDIUM, METHOD AND APPARATUS FOR MANUFACTURING THE MULTILAYER OPTICAL RECORDING MEDIUM

CROSS REFERENCE TO RELATED APPLICATIONS

This application claims the foreign priority benefit under Title 35, United States Code, §119(a)-(d) of Japanese Patent Application No. 2009-059617 filed on Mar. 12, 2009 in the Japan Patent Office, the disclosure of which is herein incorporated by reference in its entirety.

BACKGROUND OF THE INVENTION

The present invention relates to a multilayer optical recording medium, a method and an apparatus for manufacturing the multilayer optical recording medium. More specifically, the present invention relates to a multilayer optical recording medium having a plurality of intermediate layers each interposed between adjoining optical recording layers, a method and an apparatus for manufacturing such a multilayer optical recording medium.

In order to increase recording capacity of an optical recording medium, a recording method for recording data in multiple layers in addition to increasing recording density in a planar direction has been studied in recent years, and such a method has been gradually put to practical use. Multilayer optical recording medium may have an intermediate layer between adjoining recording layers disposed in a thickness direction of the medium for the purpose of preventing an occurrence of crosstalk between the adjoining recording layers. For example, Japanese Laid-open Patent Publication Nos. 2008-108381 and 2005-259192 disclose methods of manufacturing a multilayer optical recording medium having such an intermediate layer, in which a plurality of recording layer units each consisting of an adhesive layer (intermediate layer) and a recording layer are laminated. According to these methods, a release film is provided on each side of the recording layer unit, and each recording layer unit is adhered and stacked on other recording layer units after the release film thereof is peeled off one at a time.

However, according to the above methods of manufacturing a multilayer optical recording medium, it is inconvenient to handle the recording layer units because they do not have any supporting structure. For this reason, a further improvement on the productivity has been desired. Furthermore, in order to realize high recording density, an improvement on the productivity has been desired while maintaining necessary optical performances of the multilayer optical recording medium.

In view of the above, an object of the present invention is to improve productivity on a multilayer optical recording medium while maintaining satisfactory optical performances of the optical recording medium.

SUMMARY OF THE INVENTION

According to a first aspect of the present invention, there is provided a multilayer optical recording medium comprising: a substrate; a plurality of optical recording layers provided on the substrate; and a plurality of intermediate layers each provided between adjoining optical recording layers disposed in a thickness direction, wherein each of the intermediate layers has a birefringence property, and a principal axis direction of birefringence of each intermediate layer is oriented at 90 degrees with respect to that of an adjoining intermediate layer.

In this configuration of the multilayer optical recording medium, if a plurality of intermediate layers are produced from an elongated base film material which is efficiently produced by a process such as drawing, an improvement on the productivity can be achieved. Further, when a light beam for recording and/or reading data and having a substantially circular cross-section passes through an intermediate layer having a birefringence property, the cross-section of the light beam becomes an ellipse, and this makes it difficult to narrow the light beam to a small spot if a plurality of intermediate layers are superposed with their principal axis directions of birefringence oriented in the same direction. However, the multilayer optical recording medium according to the present invention is configured such that a principal axis direction of birefringence of each intermediate layer is oriented at 90 degrees with respect to that of an adjoining intermediate layer. Therefore, while the light beam for recording and/or reading data passes through the plurality of intermediate layers made from the elongated base film material, the birefringence property of each intermediate layer is substantially canceled out, so that the light beam can be condensed into a small spot. In other words, it is possible to improve productivity on the multilayer optical recording medium while maintaining satisfactory optical performances of the optical recording medium.

According to a second aspect of the present invention, there is provided a method for manufacturing a multilayer optical recording medium comprising the steps of: coating an optical recording material on an elongated base film material having a birefringence property to provide a coated web; cutting out the coated web into a plurality of recording layer units; and laminating a plurality of recording layer units on a substrate such that on the basis of a longitudinal direction of the coated web a recording layer unit is oriented at 90 degrees with respect to an adjoining recording layer unit.

In this manufacturing method, a large amount of recording layer units can be manufactured efficiently by coating the optical recording material continuously on the elongated base film material that is produced by a process such as drawing and cutting out the coated base film (coated web) into a plurality of recording layer units. Further, when a plurality of recording layer units each having a base film layer and an optical recording layer are laminated on a substrate, an intermediate layer consisting of the base film layer (base film) is formed between adjoining optical recording layers. Therefore, it is not necessary to provide a release film on each side of the recording layer unit having an adhesive layer (intermediate layer) and a recording layer and to peel off these release films as in the case of the conventional manufacturing methods.

Normally, an elongated base film material is produced by drawing and therefore has a birefringence property, so that if a plurality of recording layer units formed from the elongated base film material are superposed in the same direction, it is difficult to narrow a light beam for recording and/or reading data to a small spot because of this birefringence property. However, in the manufacturing method according to the present invention, on the basis of the longitudinal direction of the coated web a recording layer unit is oriented at 90 degrees with respect to an adjoining recording layer unit disposed in the laminating direction. Therefore, while the light beam for recording and/or reading data passes through a plurality of base film layers, the birefringence property of each base film is substantially canceled out, so that the light beam can be condensed into a small spot. In other words, it is possible to improve productivity on the multilayer optical recording medium while maintaining satisfactory optical performances of the optical recording medium.

In the aforementioned manufacturing method, it may be preferable that the plurality of recording layer units laminated on the substrate in the laminating step are selected from a group of recording layer units arranged in line along a longitudinal direction of the coated web.

The birefringence strength of a web-like film produced by drawing is different at points in the width of the film. Therefore, the plurality of recording layer units laminated on the substrate in the laminating step may be selected from a group of recording layer units arranged in line along a longitudinal direction of the coated web. This makes it possible to reliably cancel out birefringence properties of intermediate layers (base films) in the adjoining recording layer units disposed in the laminating direction.

In the aforementioned preferable manufacturing method, in which the plurality of recording layer units are selected from a group of recording layer units arranged in line along a longitudinal direction of the coated web, it may be further preferable that adjoining recording layer units laminated in the laminating step are selected from recording layer units which are adjacent to each other in a line extending along the longitudinal direction of the coated web.

In this manufacturing method, adjacent portions of the elongated base film material whose birefringence are particularly close to each other can be adjoined in a laminating direction. This makes it possible to more reliably cancel out birefringence properties of intermediate layers (base films) in the adjoining recording layer units disposed in the laminating direction.

In the aforementioned manufacturing method, it may be preferable that the optical recording material contains a two-photon absorbing compound which causes a two-photon absorbing reaction, and a dye precursor which changes into dye by energy obtained from the two-photon absorbing reaction of the two-photon absorbing compound.

Further, according to a third aspect of the present invention, there is provided an apparatus for manufacturing a multilayer optical recording medium comprising: a supporting portion having a supporting surface for supporting a substrate and configured to be rotatable around an axis orthogonal to the supporting surface; a laminating device configured to laminate a plurality of recording layer units on a substrate placed on the supporting portion, wherein each recording layer unit comprises a base film having a birefringence property, and an optical recording material layer provided on the base film; and a controller configured to control a rotation of the supporting portion and an operation of the laminating device, wherein the controller comprises means for rotating the supporting portion by 90 degrees each time when one recording layer unit is laminated by the laminating device.

In this configuration of the manufacturing apparatus, during the lamination of a plurality of recording layer units on a substrate supported by the supporting portion by means of the laminating device, the controller causes the supporting portion to rotate by 90 degrees after one recording layer unit is laminated by the laminating device and before a subsequent recording layer unit is laminated. Therefore, even if a plurality of recording layer units which may be formed from an elongated base film material are supplied to the laminating device with their orientations unchanged, it is possible that principal axis directions of birefringence of intermediate layers (base films) in the adjoining recording layer units disposed in the laminating direction are arranged orthogonally to each other. For this reason, birefringence properties are substantially cancelled out in the adjoining intermediate layers (base films) disposed in the laminating direction. According to this manufacturing apparatus, it is possible to improve productivity on the multilayer optical recording medium while maintaining satisfactory optical performances of the optical recording medium.

In the aforementioned manufacturing apparatus, the controller may cause the supporting portion to rotate by 90 degrees in the same direction as the previous rotation of the supporting portion. As an alternative, the controller may cause the supporting portion to rotate by 90 degrees in the opposite direction from the previous rotation of the supporting portion.

In the aforementioned multilayer optical recording medium, method and apparatus for manufacturing the multilayer optical recording medium according to the present invention, an elongated base film material may be used as a material for the intermediate layers and a principal axis direction of birefringence of each intermediate layer is oriented at 90 degrees with respect to that of an adjoining intermediate layer disposed in the laminating direction. Therefore, it is possible to improve productivity on the multilayer optical recording medium while maintaining satisfactory optical performances of the optical recording medium.

BRIEF DESCRIPTION OF THE DRAWINGS

To better understand the claimed invention, and to show how the same may be carried into effect, reference will now be made, by way of example only, to the accompanying drawing, in which:

FIG. 5 is a view explaining the configuration of a manufacturing apparatus for carrying out a laminating process;

FIG. 9 is a table showing positions on the coated web from which samples were obtained and birefringence amount at each position; and FIG. 10 is a table showing birefringence amount for examples and comparative examples.

DETAILED DESCRIPTION OF THE INVENTION

With reference the accompanying drawings, an exemplified embodiment of the present invention will be described.

Figure 1:
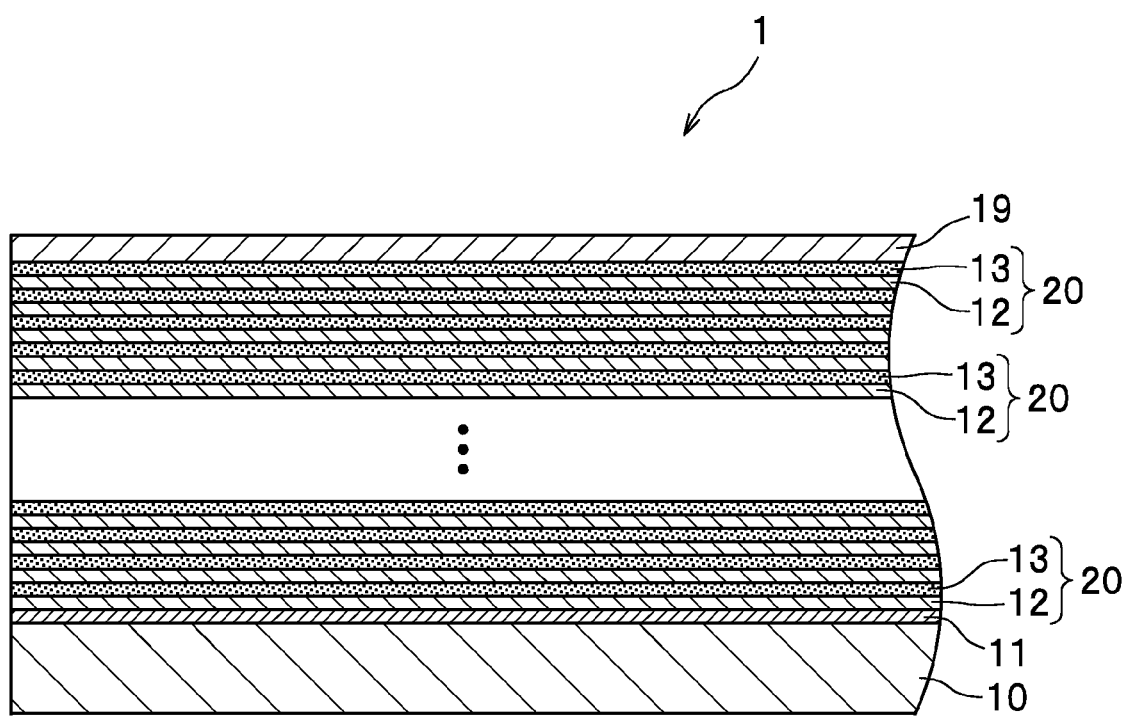
FIG. 1 is a sectional view of a multilayer optical recording medium according to an exemplary embodiment of the present invention.

As seen in FIG. 1, an optical disc 1, which is an example of a multilayer optical recording medium according to the present invention, includes a substrate 10, an adhesive layer 11 provided on the substrate 10, and a plurality of recording layer units 20 laminated on the adhesive layer 11. Each recording layer unit 20 consists of a intermediate layer 12 made of a base film having a birefringence property, and an optical recording layer 13. For example, 20 (twenty) layers of recording layer units 20 are laminated. A cover layer 19 is provided on the uppermost optical recording layer 13, so as to protect the optical recording layer 13.

The substrate 10 is a supporting member for maintaining rigidity of the optical disc 1. In the case where data is recorded on and/or read from the optical disc 1 from the substrate 10 side, it is preferable that the substrate 10 has transmissivity of a light beam for recording and/or reading data and does not have any birefringence property. Meanwhile, in the case where recording and/or reading of data is performed by irradiating the optical recording layer 13 with a light beam from the cover layer 19 side, the substrate 10 is not required to have transmissivity of a light beam. As an example, the substrate 10 may be made of an inorganic material including glass, quartz, zirconium oxide and zinc oxide, or an organic material including polycarbonate, polyethylene terephthalate, polymethyl acrylate and polychlorotrifluoroethylene.

The adhesive layer 11 is a layer for attaching the recording layer unit 20 to the substrate 10 during the manufacture of the optical disc 1. The material and the thickness of the adhesive layer 11 are not limited as long as the optical disc 1 does not lose its rigidity and optical characteristics. For example, an acrylic-based, rubber-based, or silicon-based adhesive agent may be used as the adhesive layer 11. From the view point of transparency and durability, it is preferable to use an acrylic-based adhesive agent. A preferable example of the acrylic-based adhesive agent is a compound that mainly contains 2-ethylhexyl acrylate or n-butyl acrylate, and to increase the cohesive force, the compound further contains copolymers of a short chain alkyl acrylate or methacrylate such as methyl acrylate, ethyl acrylate and methyl methacrylate, and acrylic acid, methacrylic acid, acrylamide derivative, maleic acid, hydroxylethyl acrylate and glycidyl acrylate, all of which can work as a cross-linking point with a cross-linking agent. The mixing ratio and the kinds are appropriately adjusted among the principal component, the short-chain component, and the component for adding the cross-linking site, so that a glass-transition temperature (Tg) and a cross-link density can be varied.

An example of the cross-linking agent which can be used together with the adhesive agent includes an isocyanate cross-linking agent. Examples of the isocyanate cross-linking agent include isocyanates such as trilene diisocyanate, 4,4'-diphenylmethane diisocyanate, hexamethylene diisocianate, xylylene diisocyanate, naphthylene-1,5-diisocyanate, o-toluidine isocyanate, isohorone diisocyanate and triphenylmethane triisocyanate; reaction products of these isocyanates and polyalcohols; and polyisocyanates produced by the condensation of the isocyanates. Examples of commercially available products of the isocyanates include: CORONATE L, CORONATE HL, CORONATE 2030, CORONATE 2031, MILLIONATE MR and MILLIONATE HTL (all trade names, manufactured by Nippon Polyurethane Industry Co. Ltd.); TAKENATE D-102, TAKENATE D-110N, TAKENATE D-200 and TAKENATE D-202 (all trade names, manufactured by Takeda Chemical Industries Co., Ltd.); and DESMODULE L, DESMODULE IL, DESMODULE N and DESMODULE HL (all trade names, manufactured by Sumitomo Bayer Co., Ltd.).

The base film which forms the intermediate layer 12 is colorless and transparent with respect to a light beam for recording and/or reading data, and the birefringence (birefringence amount) per base film is preferably not more than 50 nm. Preferable examples of the base film include polycarbonate, polyvinyl chloride, polyethylene terephthalate, polymethyl acrylate, polychlorotrifluoroethylene, polypropylene, and polyolefin. Among these materials, polyethylene terephthalate and polypropylene are more preferable.

It is more preferable that the birefringence per base film is not more than 30 nm.

The optical recording layer 13 is a layer for storing information by optical modulation. In order to perform multilayer optical recording, it is preferable to use a two-photon absorbing compound which is less likely to allow crosstalk to occur between adjoining recording layers. To be more specific, the optical layer 13 may comprise a two-photon absorbing compound which causes a two-photon absorbing reaction, a dye precursor which changes into dye by energy obtained from the two-photon absorbing reaction of the two-photon absorbing compound, and a polymer binder.

In this embodiment, it is preferable that the two-photon absorbing compound is an organic compound.

According to the present invention, when a particular region is called a "group", the group may be substituted with one or more substituent groups (up to the greatest number possible) or may not be substituted, unless specified otherwise. For example, an "alkyl group" means a substituted or unsubstituted alkyl group. The substituent group which can be used for the compound according to the invention may be any substituent group with or without substitution.

Also in the present invention, when a particular region is called a "ring", or when the "group" contains a "ring", the ring may be a monocyclic ring or a condensed ring and may be substituted or unsubstituted, unless specified otherwise.

For example, an "aryl group" may be a phenyl group, a naphthyl group, or a substituted phenyl group.

Two-Photon Absorbing Compound

The two-photon absorbing compound used for the present invention is a compound that undergoes non-resonant two-photon absorption, that is a phenomenon in which a compound is excited by simultaneous absorption of two photons in an energy range where no linear absorption band of the compound exists.

Various kinds of compounds used for a simultaneous two-photon absorption three-dimensional optical recording medium according to the present invention are not limited to specific compounds, and for example, the compounds disclosed in Japanese Laid-open Patent Publication Nos. 2007-262155, 2007-87532, 2007-59025, 2007-17887, 2007-17886, 2007-17885, 2006-289613, 2005-320502, 2005-164817, 2005-100606, 2005-100599, 2005-92074, 2005-85350, 2005-71570, 2005-55875, 2005-37658, 2003-75961, and 2003-29376 can be used.

The two-photon absorption compound used for the present invention is preferably a methine dye. The dye is a generic term for the compounds having a group absorbing a light in the ultraviolet range (preferably from 200 to 400 nm), visible light range (from 400 to 700 nm), or near-infrared region (from 700 to 2000 nm).

The methine dye according to the present invention is not limited to a specific dye. For example, the methine dye may include cyanine dyes, hemicyanine dyes, streptocyanine dyes, styryl dyes, merocyanine dyes, trinuclear merocyanine dyes, tetranuclear merocyanine dyes, rhodacyanine dyes, complex cyanine dyes, complex merocyanine dyes, allopolar dyes, oxonol dyes, hemioxonol dyes, squalium dyes, arylidene dyes, and polyene dyes.

More preferably, the methine dye may include cyanine dyes, hemicyanine dyes, streptocyanine dyes, styryl dyes, merocyanine dyes, trinuclear merocyanine dyes, tetranuclear merocyanine dyes, rhodacyanine dyes, oxonol dyes, squalium dyes, and arylidene dyes, and further more preferably, the methine dye may include cyanine dyes, merocyanine dyes, and oxonol dyes.

These dyes are described in detail, for example, by F. M. Harmer, "Heterocyclic Compounds-Cyanine Dyes and Related Compounds", John Wiley & Sons, New York-London, 1964; D. M. Sturmer, "Heterocyclic Compounds-Special topics in heterocyclic chemistry", chapter 18, paragraph 14, pp. 482-515, John Wiley & Sons, New York-London, 1977; and "Rodd's Chemistry of Carbon Compounds", 2nd Ed. vol. IV, part B, 1977, chapter 15, pp. 369-422, Elsevier Science Publishing Company Inc., New York.

Specific examples of the cyanine dyes, merocyanine dyes, and oxonol dyes include those described in F. M. Harmer, "Heterocyclic Compounds-Cyanine Dyes and Related Compounds", John Wiley & Sons, New York-London, 1964.

Preferable examples of general formulae of the cyanine dyes and merocyanine dyes are those given by formulae (XI) and (XII) described at pages 21 and 22 of U.S. Pat. No. 5,340,694 (however, the numbers represented by n12 and n15 are not limited and each number is an integer of 0 or more (preferably from 0 to 4)).

Dye Precursor

The dye precursor according to the present invention may be BLD compounds given by general formula (6) described in Japanese Laid-open Patent Publication No. 2000-284475, leuco dyes described in Japanese Laid-open Patent Publication No. 2000-144004, and leuco dyes having structures shown below.

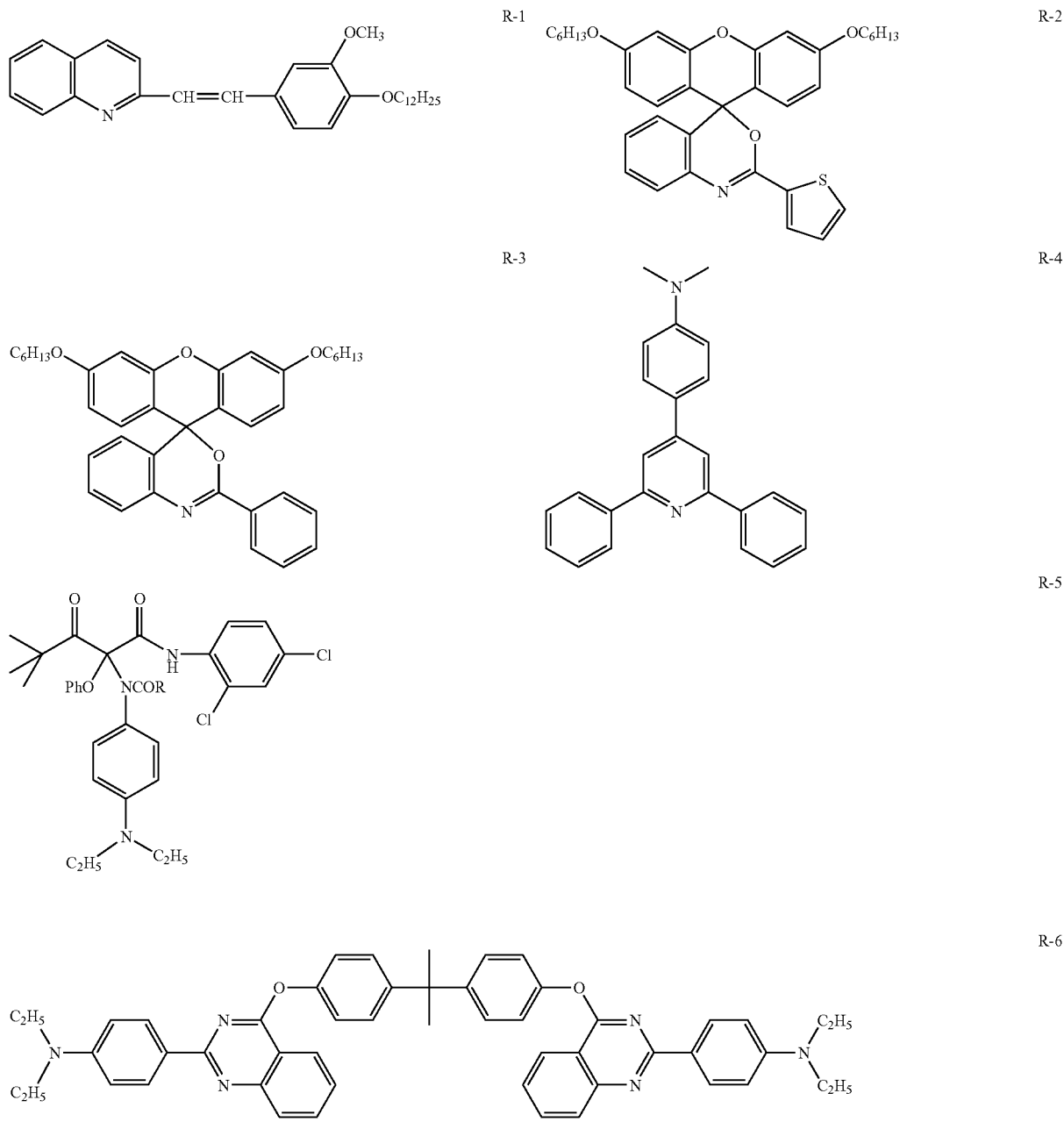

Polymerization Initiator

According to the present invention, a polymerization initiator may be used in place of the dye precursor or in addition to the dye precursor.

The polymerization initiator for use in the present invention is a compound capable of generating a radical or an acid (Broensted acid or Lewis acid) as a result of energy or electron transfer (giving or accepting an electron) from the excited state of the two-photon absorbing compound, which is produced by non-resonant two-photon absorption, and thereby initiating polymerization of a polymerizable compound.

The polymerization initiator for use in the present invention is preferably any one of a radical polymerization initiator capable of generating a radical to initiate the radical polymerization of the polymerizable compound, a cationic polymerization initiator capable of generating only an acid without generating a radical to initiate only the cationic polymerization of the polymerizable compound, and a polymerization initiator capable of generating both a radical and an acid to initiate both the radical polymerization and the cationic polymerization.

The polymerization initiator used for the two-photon absorption three-dimensional recording medium according to the present invention may be those described in Japanese Laid-open Patent Publication Nos. 2004-346238, 2005-97538, 2005-99416, 2004-292475, and 2004-292476.

As the polymerization initiator for use in the present invention, the following 14 systems are preferred. If desired, these polymerization initiators may be used as a mixture of two or more thereof at an arbitrary ratio.
1) Ketone-base polymerization initiator
2) Organic peroxide-base polymerization initiator
3) Bisimidazole-base polymerization initiator
4) Trihalomethyl-substituted triazine-base polymerization initiator
5) Diazonium salt-base polymerization initiator
6) Diaryliodonium salt-base polymerization initiator
7) Sulfonium salt-base polymerization initiator
8) Borate-base polymerization initiator
9) Diaryliodonium organic boron complex-base polymerization initiator
10) Sulfonium organic boron complex-base polymerization initiator
11) Cationic two-photon absorbing compound organic boron complex-base polymerization initiator
12) Anionic two-photon absorbing compound onium salt complex-base polymerization initiator
13) Metal arene complex-base polymerization initiator
14) Sulfonic acid ester-base polymerization initiator Polymer Binder The optical recording material according to the present invention contains a monomer which is involved in recording and/or storage and generally called as a polymer binder, and a polymer compound for retaining a photopolymerization initiator. The polymer binder is used for the purposes of enhancing film performance, film strength, and recording property. The polymer binder is preferably a solvent-soluble thermoplastic polymer, and one or more solvent-soluble thermoplastic polymers can be used individually or in combination. Preferred examples of the polymer binder include: acrylates, α-alkyl acrylate esters, acidic polymers and interpolymers (for example, polymethyl methacrylate, polyethyl methacrylate and copolymer of methyl methacrylate with other alkyl(meth)acrylate), polyvinyl esters (for example, polyvinyl acetate, polyvinyl acetate/acrylate, polyvinyl acetate/methacrylate, and hydrolysis-type polyvinyl acetate), ethylene/vinyl acetate copolymers, saturated or unsaturated polyurethanes, butadiene and isoprene polymers and copolymers, high molecular weight polyethylene oxides of polyglycol having a weight average molecular weight of 4,000 to 1,000,000, epoxidates (for example, epoxidate having an acrylate or methacrylate group), polyamides (for example, N-methoxymethyl polyhexamethylene adipamide), cellulose esters (for example, cellulose acetate, cellulose acetate succinate and cellulose acetate butyrate), cellulose ethers (for example, methyl cellulose, ethyl cellulose, ethyl benzyl cellulose), polycarbonates, polyvinyl acetals (for example, polyvinyl butyral and polyvinyl formal), polyvinyl alcohols, polyvinylpyrrolidones, acid-containing polymers and copolymers which work as an appropriate binder and disclosed in U.S. Pat. Nos. 3,458,311 and 4,273,857, polystyrene polymers and copolymers with, for example, acrylonitrile, maleic anhydride, acrylic acid, methacrylic acid or an ester thereof, vinylidene chloride copolymers (e.g., vinylidene chloride/acrylonitrile copolymer, vinylidene chloride/methacrylate copolymer, vinylidene chloride/vinyl acetate copolymer), polyvinyl chloride and copolymers thereof (e.g., polyvinyl chloride/acetate, vinyl chloride/acrylonitrile copolymer), polyvinyl benzal synthetic rubbers (e.g., butadiene/acrylonitrile copolymer, acrylonitrile/butadiene/styrene copolymer, methacrylate/acrylonitrile/butadiene/styrene copolymer, 2-chlorobutadiene-1,3 polymer, chlorinated rubber, styrene/butadiene/styrene, styrene/isoprene/styrene block copolymer), copolyesters (for example, polymethylene glycol represented by the formula: $(HO(CH_2)_nOH$ (wherein n is an integer of 2 to 10), those produced from a reaction product of (1) hexahydroterephthalic acid, sebacic acid and terephthalic acid, (2) terephthalic acid, isophthalic acid and sebacic acid, (3) terephthalic acid and sebacic acid, or (4) terephthalic acid and isophthalic acid, and a mixture of copolyesters produced from (5) the glycol and (i) terephthalic acid, isophthalic acid and sebacic acid or (ii) terephthalic acid, isophthalic acid, sebacic acid and adipic acid), poly-N-vinylcarbazole and copolymers thereof, and carbazole-containing polymers disclosed in H. Kamogawa et al., Journal of Polymer Science: Polymer Chemistry Edition, Vol. 18, pp. 9-18 (1979).

Specific examples of the polymer binder for use in the present invention are disclosed, for example, in Japanese Laid-open Patent Publication Nos. 2007-262155, 2007-87532, 2007-59025, 2007-17887, 2007-17886, 2007-17885, 2006-289613, 2005-320502, 2005-164817, 2005-100606, 2005-100599, 2005-92074, 2005-85350, 2005-71570, 2005-55875, 2005-37658, 2003-75961, 2003-29376, H05-27436, and H06-43634.

In addition, a fluorine atom-containing polymer is also preferable as the binder. The polymer is preferably an organic solvent-soluble polymer containing a fluoroolefin as an essential component and containing, as a copolymerization component, one or more unsaturated monomer selected from an alkyl vinyl ether, an alicyclic vinyl ether, a hydroxyvinyl ether, an olefin, a haloolefin, an unsaturated carboxylic acid or an ester thereof, and a vinyl carboxylate. The weight average molecular weight thereof is preferably from 5,000 to 200,000 and the fluorine atom content is preferably from 5 to 70 wt %.

The cover layer 19 consists of a sheet for protecting the optical recording layer 13. In the case where recording/reading of the data is performed from the cover layer 19 side, the cover layer 19 can transmit a light beam used for recording/reading of the data and preferably does not have a birefringence property. On the contrary, in the case where recording/reading of the data is performed from the substrate 10 side, it is not necessary that the cover layer 19 have transmissivity.

The cover layer 19 may be made of any known material. Preferred examples of the material for the cover layer 19 include: acrylic resins as transparent film materials such as polycarbonate and polymethylmethacrylate; vinyl chloride-base resins such as polyvinyl chloride and vinyl chloride copolymer; epoxy resin; amorphous polyolefin; polyester; and cellulose triacetate. Of these materials, polycarbonate and cellulose triacetate are more preferable.

Further, various additive agents may be contained in the cover layer 19. For example, a UV absorbing agent for cutting off light whose wavelength is not more than 400 nm may be contained in the cover layer 19.

Figure 2:
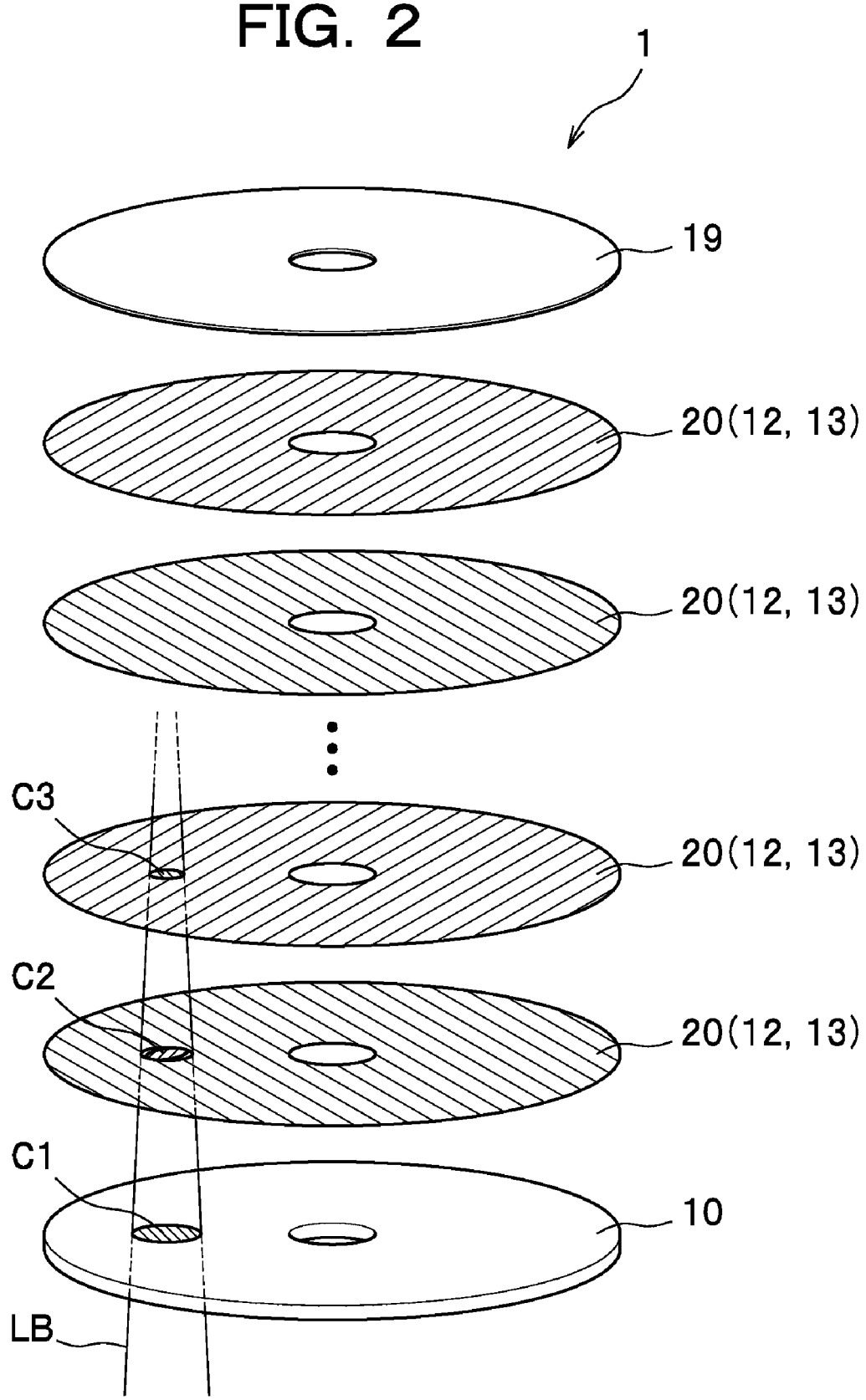
FIG. 2 is an exploded perspective view explaining the configuration of the multilayer optical recording medium.

As seen in FIG. 2, a plurality of recording layer units 20 laminated on the substrate 10 are arranged such that on the basis of adjoining recording layer units 20 (intermediate layers 12) disposed in the laminating direction, the principal axis direction of birefringence of each intermediate layer 12 is offset from that of the adjoining intermediate layer 12 by 90 degrees. In other words, the longitudinal direction of the base film which is to be a first intermediate layer 12 is offset by 90 degrees with respect to the adjoining base film which is to be a second intermediate layer 12 adjoining the first intermediate layer 12 disposed in the laminating direction. For the purpose of explanation, the principal axis direction of birefringence (substantially corresponding to the longitudinal direction of the coated web 20A) is shown by hatching on each of the recording layer units 20 in the attached drawings.

The optical disc 1 according to this embodiment is configured as described above, and upon recording or reading the data on or from the optical disc 1, if a laser beam LB (laser beam LB is shown in FIG. 2 in an exaggerated manner) is emitted, for example, from the substrate 10 side, the cross-section of the laser beam LB is changed from a circular-shaped cross-section C1 into an ellipse-shaped cross-section C2 after the laser beam LB passes through the lowermost intermediate layer 12 (upper and lower directions are defined with reference to FIG. 2) because of the birefringence property of the intermediate layer 12. However, when the laser beam LB passes through the next intermediate layer 12 that is one layer higher than the lowermost intermediate layer 12, the cross-section of the laser beam LB is changed from the ellipse-shaped cross-section C2 into a substantially circular-shaped cross-section C3 because the principal axis direction of birefringence of the next intermediate layer 12 is offset by 90 degrees with respect to that of the lowermost intermediate layer 12.

According to the optical disc 1 in this embodiment, since the principal axis directions of birefringence are offset by 90 degrees between adjoining intermediate layers 12 disposed in the laminating direction, even if the intermediate layers 12 are made of a material having a birefringence property, the laser beam LB can be condensed into a small spot having a satisfactory circular-shaped cross-section.

A method for manufacturing an optical disc 1 and an apparatus for manufacturing an optical disc 1 will be described below.

In order to efficiently manufacture recording layer units 20 in mass production, the optical disc 1 has a plurality of intermediate layers 12 each made of a plastic base film that is produced by a process such as drawing.

Figure 3:
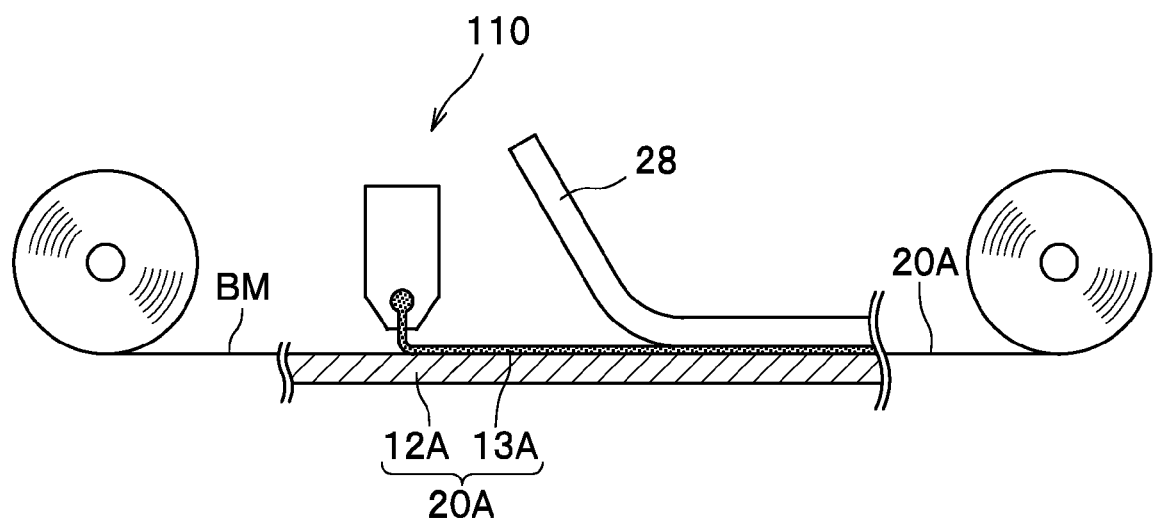
FIG. 3 is a view explaining a coating process.

As best seen in FIG. 3, in the coating step, while unwinding a wide and elongated base film material BM, an optical recording material 13A which forms an optical recording layer 13 is applied (coated) on the elongated base film material BM by a doctor blade coater 110. Throughout the specification, a base film 12A on which an optical recording material 13A has been applied is referred to as a "coated web" 20A.

In order to improve handleability of the coated web 20A until the next step, a release sheet 28 made from a plastic sheet or a release paper is attached to the coated web 20A on the side of the optical recording material 13A, and the obtained coated web 20A is wound up.

Figure 4A:
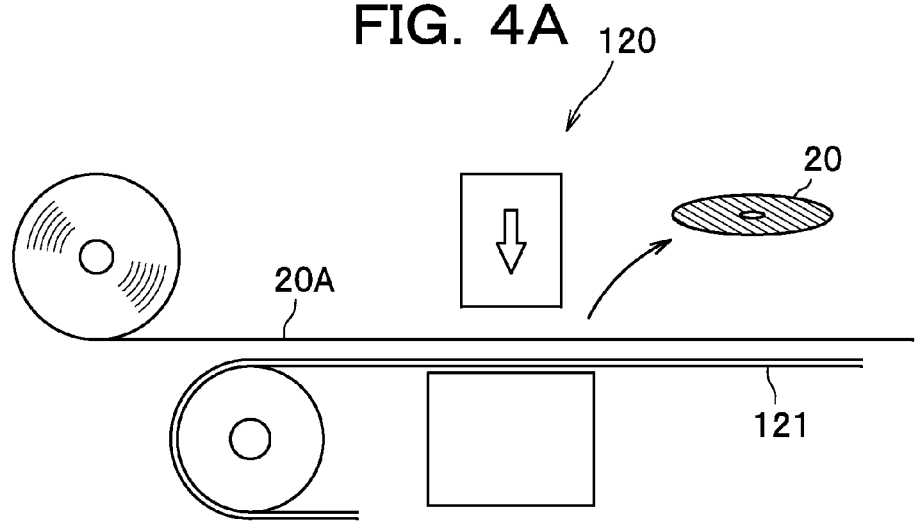
FIG. 4A is a view explaining a cutting process.
Figure 4B:
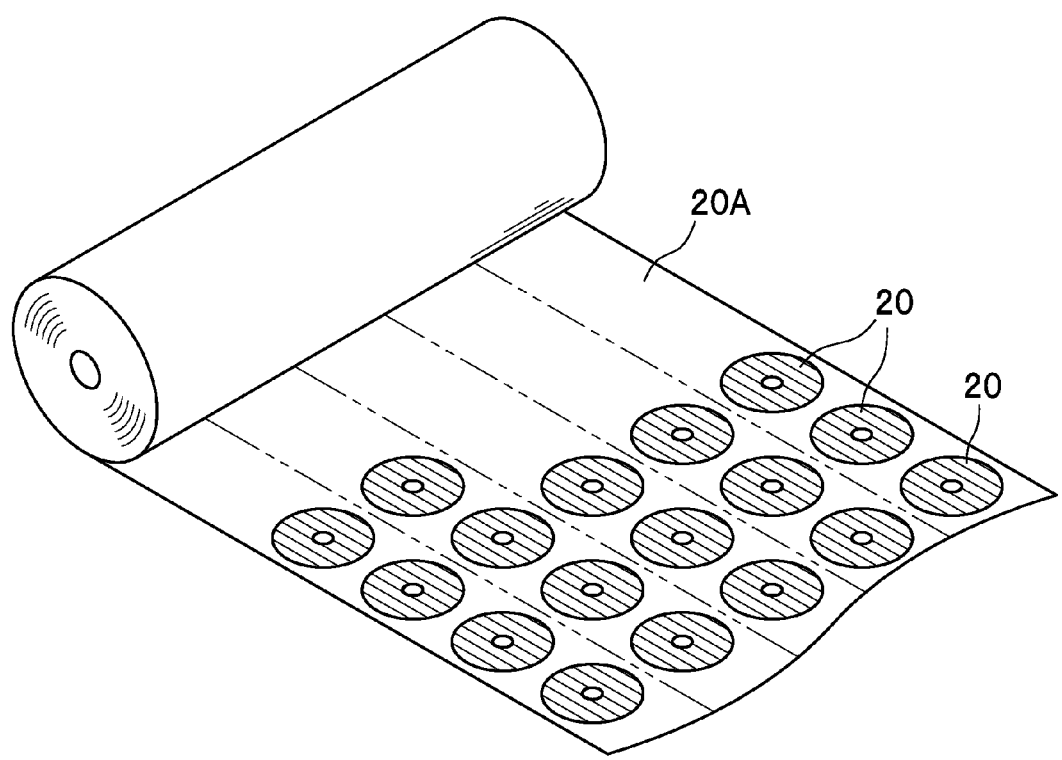
FIG. 4B is a perspective view explaining an arrangement of a plurality of recording layer units produced by cutting in the cutting process.

Next, as seen in FIG. 4A, in the cutting step, while unwinding the coated web 20A, the coated web 20A is cut into a plurality of recording layer units 20 having an outer profile shape corresponding to that of the optical disc 1 by means of a blanking device 120. During the cutting step, as seen in FIG. 4B, plural rows of recording layer units 20 are cut out along the longitudinal direction of the coated web 20A in such a manner that a plurality of recording layer units 20 are arranged in line along the width of the coated web 20A. Although FIG. 4A shows for the purpose of explanation that the recording layer unit 20 punched out by the blanking device 120 is removed from the coated web 20A, the recording layer units 20 may be left on a conveyor belt 121 and conveyed to the subsequent step along the conveyor belt 121. This makes it possible to convey a plurality of recording layer units 20 arranged in line along the conveyance direction (longitudinal direction) of the coated web 20A with their orientations unchanged, namely without changing the direction of each recording layer unit 20.

Next, a plurality of recording layer units 20 are laminated on the substrate 10 by means of an apparatus 130 (see FIG. 5) as an example of a manufacturing apparatus during which the orientation of the recording layer unit 20 is changed. The apparatus 130 includes a conveyor 131, a transfer device 132 as an example of a laminating device, a rotary supporting device 133, and a controller 135 for controlling the conveyor 131, the transfer device 132, and the rotary supporting device 133.

The conveyor 131 is a device for carrying a plurality of recording layer units 20 from the cutting step in such a manner that principal axis directions of birefringence of the recording layer units 20 (intermediate layers 12) are oriented in the same direction. In other words, a plurality of recording layer units 20 are conveyed by the conveyor 131 such that the principal axis direction of birefringence of each recording layer unit 20 is oriented to the same direction as the longitudinal direction of the coated web 20A.

The transfer device 132 includes a vacuum suction pad 132A, and a linear actuator 132B configured to move the vacuum suction pad 132A in a vertical and horizontal directions. The transfer device 132 is controlled by the controller 135 so that operations such as sucking of the recording layer unit 20 on the conveyor 131, lifting of the recording layer unit 20, moving of the recording layer unit 20 toward and onto the rotary supporting device 133, attachment of the recording layer unit 20, and removal and disposal of the release sheet 28 are repeated.

The rotary supporting device 133 includes a table 133A as an example of a supporting portion having a supporting surface 133C for supporting a substrate 10, and a stepping motor 133B configured to rotate the table 133A at a desired angle around the axis perpendicular to the supporting surface 133C.

The operation of the stepping motor 133B is controlled by the controller 135 so that the stepping motor 133B rotates the table 133A by 90 degrees each time when the transfer device 132 finishes attaching (laminating) one recording layer unit 20 to (on) the substrate 10.

The controller 135 may cause the table 133A to rotate by 90 degrees in the same direction as a previous rotation of the table 133A each time when one recording layer unit 20 is laminated by the laminating device, namely, after one recording layer unit 20 is laminated by the laminating device and before a subsequent recording layer unit 20 is laminated. Alternatively, the controller 135 may cause the table 133A to rotate by 90 degrees in the opposite direction from the previous rotation.

Other steps not explained above with reference to the apparatus 130 may be carried out manually or using an dedicated device. Of course, the laminating step may be carried out without using the apparatus 130.

As best seen in FIGS. 6A, 6B, 7A and 7B, the laminating step is carried out using the apparatus 130.

Figure 6A:
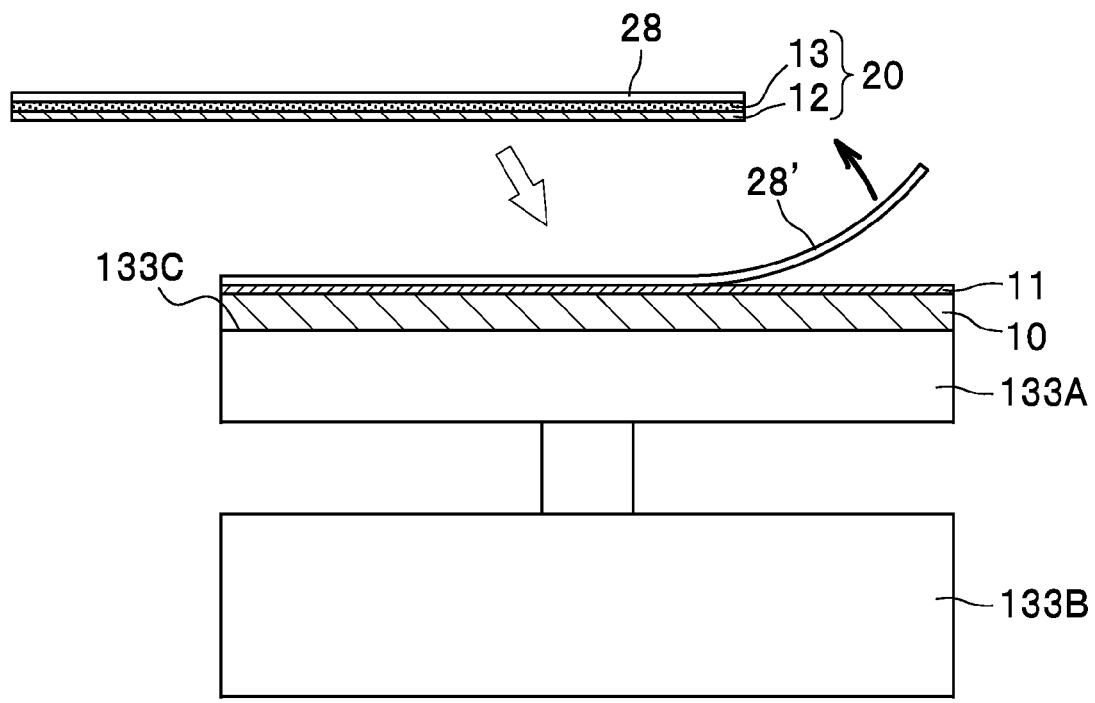
FIG. 6A is a view explaining a process for attaching a recording layer unit onto a substrate in the laminating process.

Referring firstly to FIG. 6A, a substrate 10 to which an adhesive layer 11 has been applied previously in another discrete step is set on the supporting surface 133C of the table 133A with the adhesive layer 11 facing upward. The release sheet 28' for protecting the adhesive layer 11 is peeled off, and then the transfer device 132 mounts a recording layer unit 20 on the adhesive layer 11 with the intermediate layer 12 facing downward.

Figure 6B:
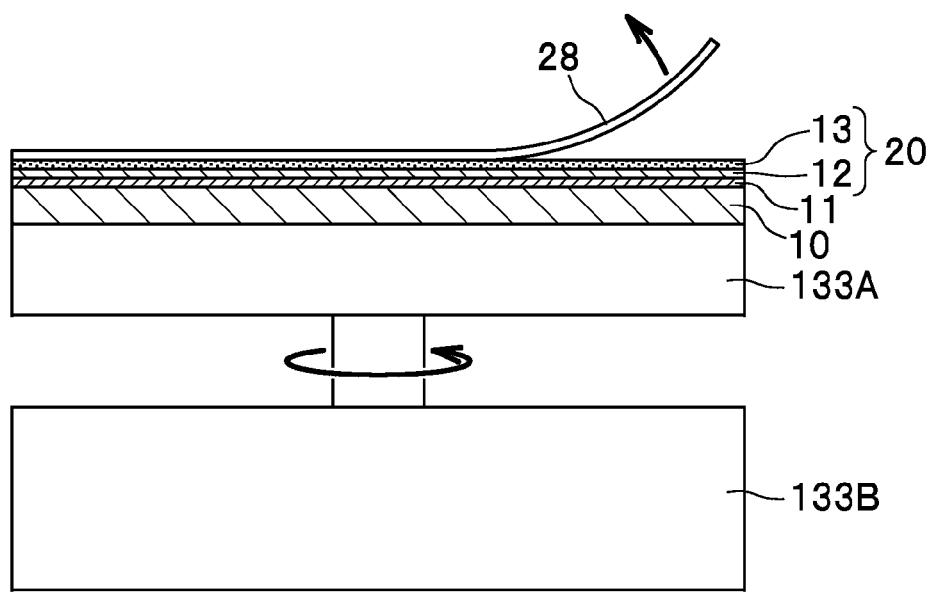
FIG. 6B is a view explaining a process for peeling off a release sheet.
Figure 7A:
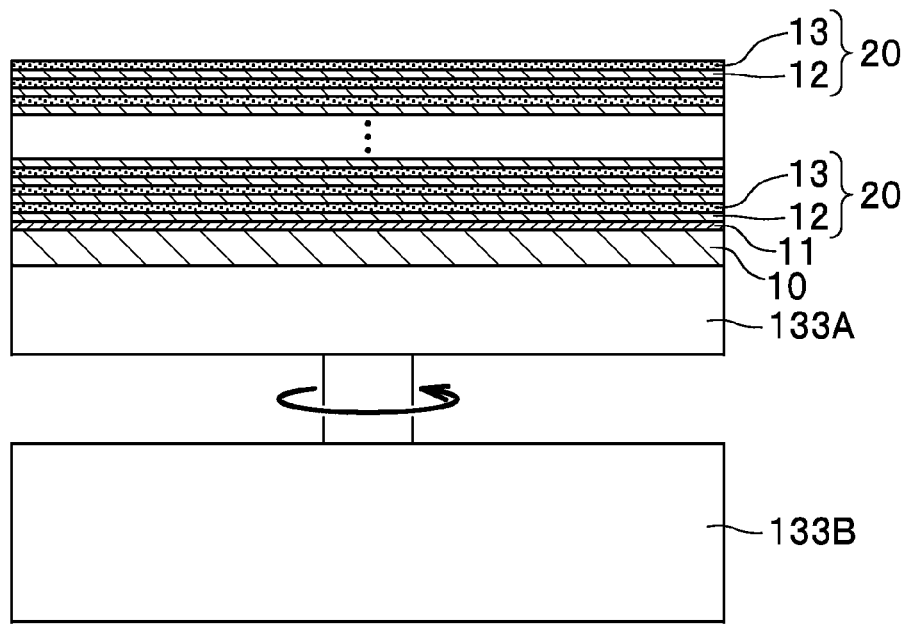
FIG. 7A is a view explaining a process for laminating a plurality of recording layer units.

Next, as seen in FIG. 6B, the release sheet 28 is peeled off, and the controller 135 controls the stepping motor 133B so as to rotate the table 133A by 90 degrees. Thereafter, attachment of the recording layer unit 20, removal of the release sheet 28, and rotation of the table 133A by 90 degrees are repeated in this order, so that a plurality of recording layer units 20 are laminated as shown in FIG. 7A.

Figure 7B:
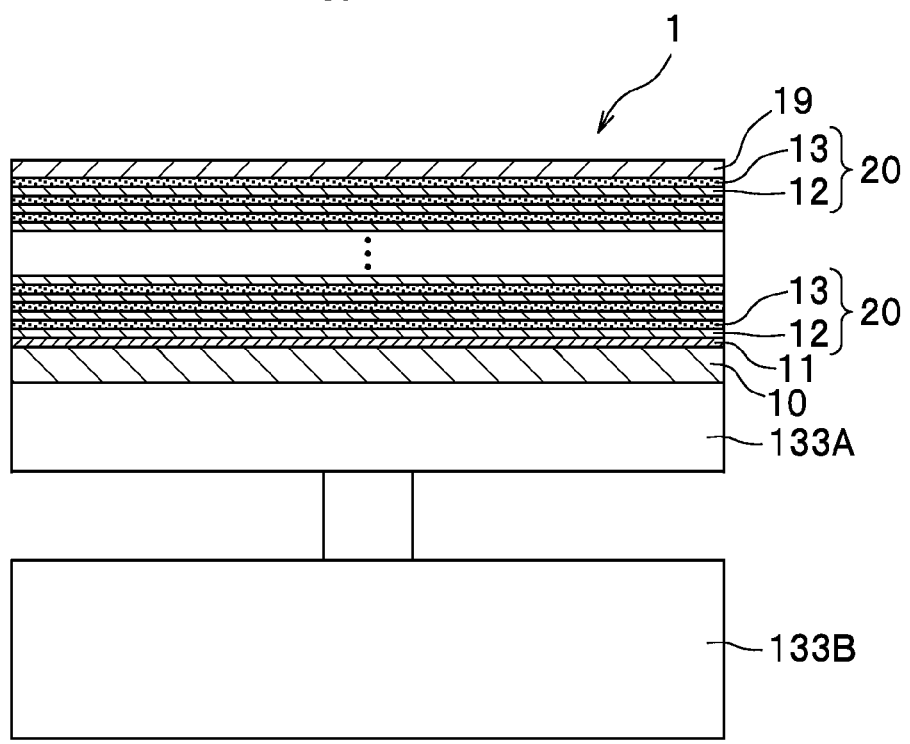
FIG. 7B is a view explaining a process for attaching a cover layer.

Finally, as seen in FIG. 7B, a cover layer 19 is attached to the uppermost optical recording layer 13, so that the manufacture of an optical disc 1 is completed.

An optical disc 1 can be manufactured as described above. According to this manufacturing method, a large amount of recording layer units 20 can be produced in a highly-efficient manner by coating the optical recording material 13A continuously on the enormously large-sized elongated base film material BM which is produced by a process such as drawing and cutting out the coated base film (coated web 20A) into a plurality of recording layer units 20. Further, when a plurality of recording layer units 20 each having a base film layer (base film 12A) and an optical recording layer 13 are laminated on a substrate 10, an intermediate layer 12 consisting of the base film 12A is formed between adjoining optical recording layers 13. Therefore, it is not necessary to provide a release sheet for supporting an adhesive layer (intermediate layer) as in the case of the conventional manufacturing methods, so that the coated web 20A and the recording layer units 20 can be handled in the manufacturing method without providing a release sheet on the side of the base film 12A.

Further, the optical disc 1 manufactured by this manufacturing method is efficiently manufactured using an elongated base film material BM which is produced by a process such as drawing. However, since the principal axis direction of birefringence of each intermediate layer 12 is oriented at 90 degrees with respect to that of an adjoining intermediate layer 12, the light beam for recording and/or reading data can be condensed into a small spot. In other words, it is possible to improve productivity on the optical disc 1 while maintaining satisfactory optical performances of the optical disc 1.

In the aforementioned manufacturing method, from which positions of the coated web 20A a plurality of recording layer units 20 are obtained and laminated on the substrate 10 has not been explained. In general, the elongated base film material BM has different birefringence distributed along the width thereof. For this reason, upon manufacturing an optical disc 1, it is preferable that a plurality of recording layer units 20 laminated on the substrate 10 are selected from a group of recording layer units 20 arranged in line along the longitudinal direction of the coated web 20A. It is further preferable that adjoining recording layer units in turn laminated on the substrate 10 are selected from recording layer units 20 which are adjacent to each other in a line extending along the longitudinal direction of the coated web 20A. According to this manufacturing method, since a plurality of intermediate layers 12 used in one optical disc 1 have substantially the same birefringence (birefringence amount), birefringence properties are substantially cancelled out in the adjoining intermediate layers 12 and the optical performance of the optical disc 1 can be improved.

Although the present invention has been described in detail with reference to the above specific embodiment, the present invention is not limited to this specific embodiment and various changes and modifications may be made without departing from the scope of the attached claims.

For example, a disc-shaped optical disc 1 has been described in the above embodiment as an example of a multilayer optical recording medium. However, the multilayer optical recording medium is not limited to a disc and may be a card-shaped square medium.

Further, it is not necessary to provide the release sheet 28 if the manufacturing method does not involve a step using the release sheet 28.

EXAMPLES

In order to prove advantageous effects of the present invention, various experimental examples are shown below.

In these examples, an optical recording material was prepared as follows.

In a darkroom, 1 g of a two-photon absorbing compound D-231 given by the following formula, 5 g of a dye precursor DP-1 given by the following formula, and 100 g of polyvinyl acetate as a binder were dissolved in a solvent that was 2800 g of dichloromethane.

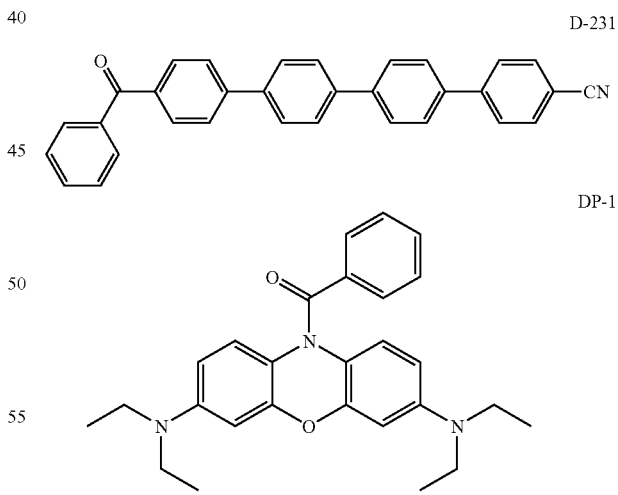

Next, in the darkroom, a coating liquid consisting of the above optical recording material was applied on a polyethylene terephthalate film substrate (manufactured by TORAY INDUSTRIES, INC) or a polypropylene substrate (manufactured by TOYOBO CO., LTD.) having a thickness of 10 μm using a doctor blade with a gap of 40 μm, and then dried to obtain a coated web. The thickness of the recording layer measured by a confocal microscope was 1 μm.

Figure 8:
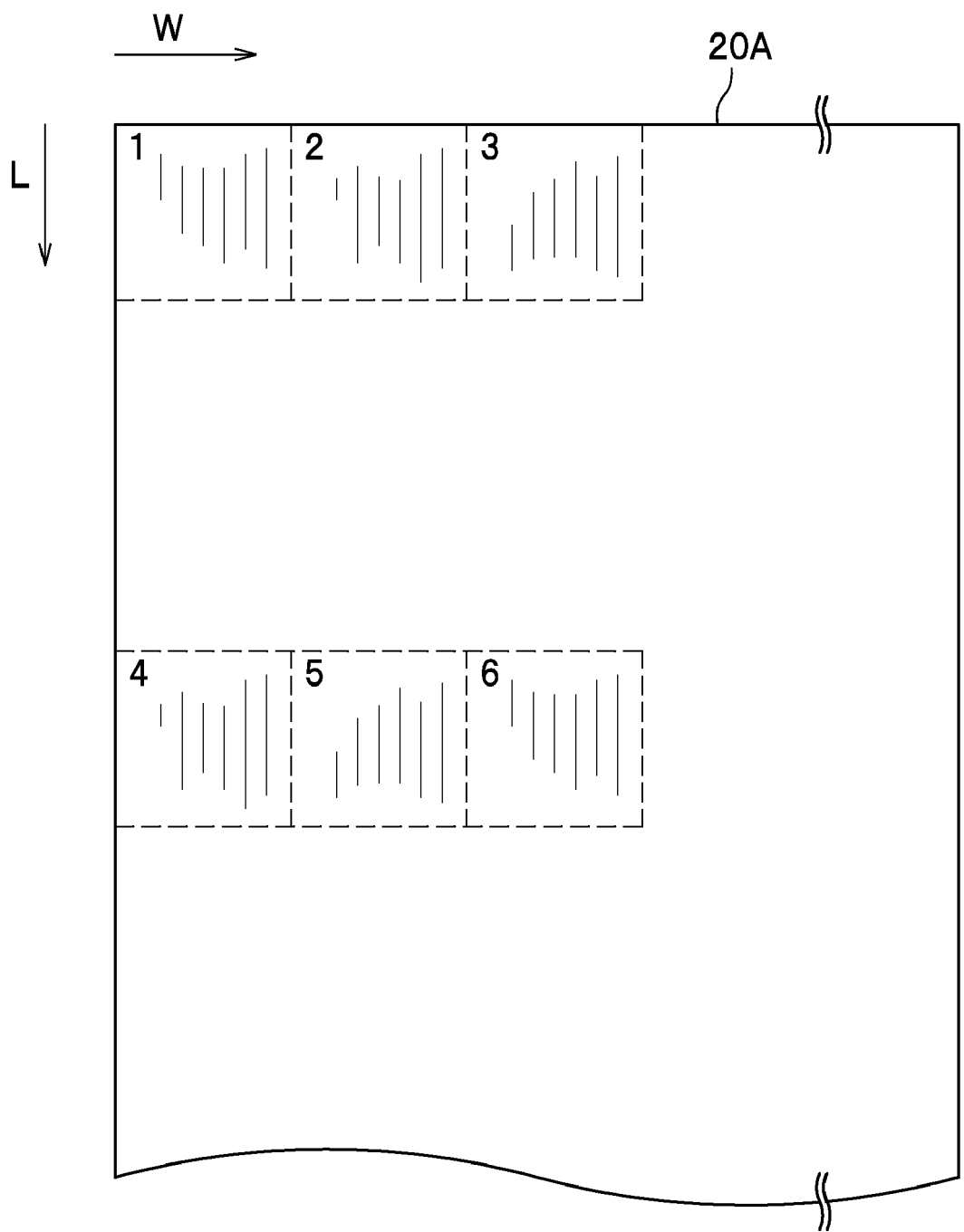
FIG. 8 is a view explaining positions on the coated web from which samples were obtained.

As seen in FIG. 8, the coated web was cut into a plurality of recording layer units. Each recording layer unit was specified based on width position W and longitudinal position L on the coated web. Detailed positions of the recording layer units on the coated web were shown in FIG. 9. FIG. 9 also shows birefringence amount and principal axis direction of birefringence for the respective recording layer units as represented by the corresponding site numbers. It is to be noted that the principal axis direction was defined such that the longitudinal direction of the coated web was 0°. Birefringence amount was measured using a three-dimensional refractometer (PSA-3DR manufactured by SAIROM TECHNICAL INC.) and with a light having a wavelength of 532 nm.

A plurality of recording layer units were laminated one by one on a substrate made of polycarbonate, which was prepared in conformity with specifications of Blu-ray disc (registered trademark) standard with the diameter of 12 cm and the thickness of 1.1 mm. Manner of laminating the recording layer units was shown in FIG. 10. With reference to FIG. 10, "REVERSE DIRECTION/90°" in the column representing "ROTATIONAL DIRECTION/ANGLE" means that each time when lamination of one recording layer unit was completed, the substrate on which one or more recording layer units had been laminated was rotated by 90 degrees in the opposite direction from the previous rotation on the basis of the longitudinal direction of the coated web. Meanwhile, "FORWARD DIRECTION/90°" means that each time when lamination of one recording layer unit was completed, the substrate on which one or more recording layer units had been laminated was rotated by 90 degrees in the same direction as the previous rotation.

After all the recording layer units were laminated, the birefringence amount of the multilayer optical recording medium as a whole was measured using the aforementioned three-dimensional refractometer. Measurement results were shown in FIG. 10.

According to EXAMPLES 1 to 4, in the cases where the plurality of recording layer units were laminated one by one in such a manner that a recording layer unit was oriented at 90 degrees with respect to an adjoining recording layer unit disposed in the laminating direction, the obtained birefringence amounts of the multilayer optical recording mediums as a whole were not more than 50 nm.

On the contrary, according to COMPARATIVE EXAMPLES 1 and 2, in the cases where the plurality of recording layer units were laminated one by one in such a manner that all the recording layer units were laminated in the same direction, the obtained birefringence amounts of the multilayer optical recording mediums as a whole showed higher values.

What is claimed is:

1. A multilayer optical recording medium comprising:
   a substrate;
   a plurality of optical recording layers provided on the substrate; and
   a plurality of intermediate layers each provided between adjoining optical recording layers disposed in a thickness direction,
   wherein each of the intermediate layers has a birefringence property, and a principal axis direction of birefringence of each intermediate layer is oriented at 90 degrees with respect to that of an adjoining intermediate layer.

2. A method for manufacturing a multilayer optical recording medium comprising the steps of:
   coating an optical recording material on an elongated base film material having a birefringence property to provide a coated web;
   cutting out the coated web into a plurality of recording layer units; and
   laminating a plurality of recording layer units on a substrate such that on the basis of a longitudinal direction of the coated web a recording layer unit is oriented at 90 degrees with respect to an adjoining recording layer unit.

3. The method according to claim 2, wherein the plurality of recording layer units laminated on the substrate in the laminating step are selected from a group of recording layer units arranged in line along a longitudinal direction of the coated web.

4. The method according to claim 3, wherein adjoining recording layer units laminated in the laminating step are selected from recording layer units which are adjacent to each other in a line extending along the longitudinal direction of the coated web.

5. The method according to claim 2, wherein the optical recording material contains a two-photon absorbing compound which causes a two-photon absorbing reaction, and a dye precursor which changes into dye by energy obtained from the two-photon absorbing reaction of the two-photon absorbing compound.

6. An apparatus for manufacturing a multilayer optical recording medium comprising:
   a supporting portion having a supporting surface for supporting a substrate and configured to be rotatable around an axis orthogonal to the supporting surface;
   a laminating device configured to laminate a plurality of recording layer units on a substrate placed on the supporting portion, wherein each recording layer unit comprises a base film having a birefringence property, and an optical recording material layer provided on the base film; and
   a controller configured to control a rotation of the supporting portion and an operation of the laminating device, wherein the controller comprises means for rotating the supporting portion by 90 degrees each time when one recording layer unit is laminated by the laminating device.

7. The apparatus according to claim 6, wherein the controller causes the supporting portion to rotate by 90 degrees in the same direction as a previous rotation of the supporting portion.

8. The apparatus according to claim 6, wherein the controller causes the supporting portion to rotate by 90 degrees in the opposite direction from a previous rotation of the supporting portion.

* * * * *